Aug. 30, 1927.
M. A. MILLER
SUPPORT FOR BAKING CRUSTS
Filed May 20 1926
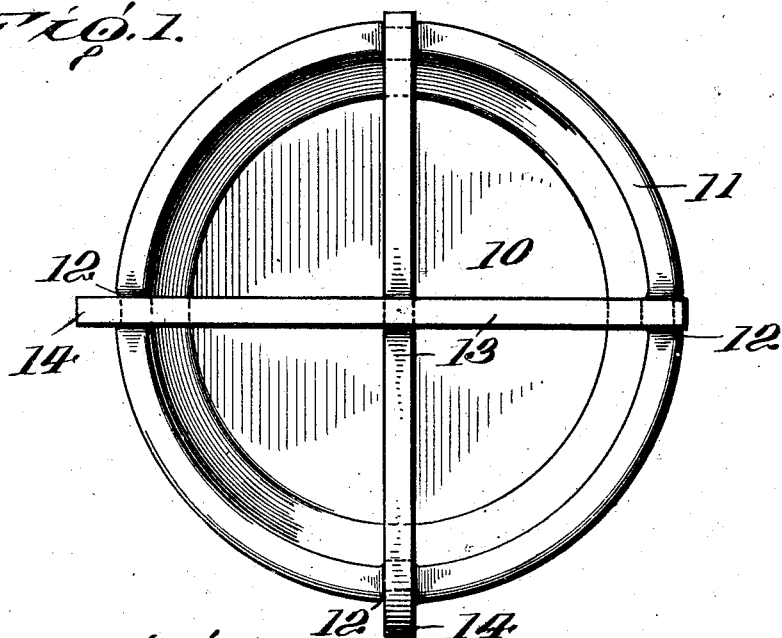
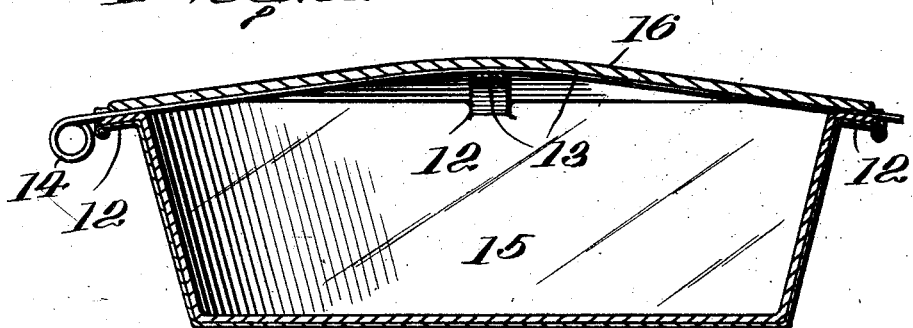
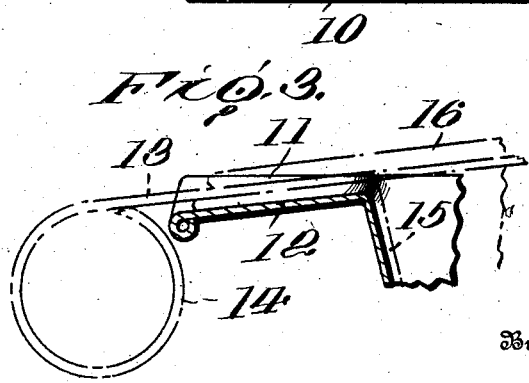
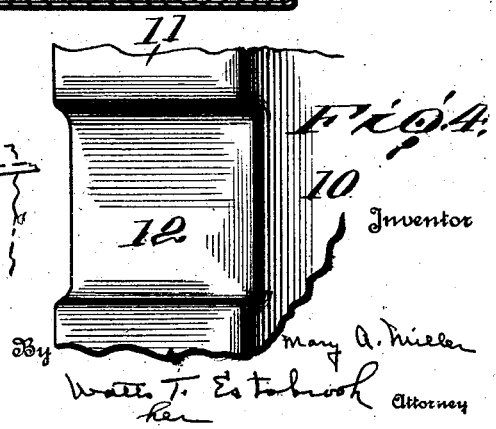

Patented Aug. 30, 1927.

1,641,090

UNITED STATES PATENT OFFICE.

MARY A. MILLER, OF LANCASTER, PENNSYLVANIA.

SUPPORT FOR BAKING CRUSTS.

Application filed May 20, 1926. Serial No. 110,452.

This invention relates to an improvement in supports for baking crusts and an object of the invention is to provide means for maintaining the crust at the proper elevation with respect to the rim of the dish or pan and prevent the top crust from sinking or falling onto the contents of the dish or pan during the baking and preventing the crust from being affected by the juices of the food being baked.

The invention consists in providing bars which extend across the top of the dish or pan for supporting the upper crust during the baking operation, and upon the completion of the baking of the contents of the pan these bars may be removed by simply imparting to them a movement which will cause a disengagement of the bars from the contacting crust, whereupon the bars may be withdrawn from beneath the crust.

The invention consists of certain novel features of construction and combinations of parts which will be hereinafter described and pointed out in the claims.

In the accompanying drawings:

Figure 1 is a top plan view showing a dish or pan with the supporting bars mounted thereon, Figure 2 is a longitudinal vertical sectional view showing the bars in position and the pan or dish lined with the dough and also showing the dough upon the supporting bars which forms the top crust, Figure 3 is an enlarged detail view in vertical section showing the depressions in the rim of the receptacle in which the bar is received, and Figure 4 is a detail view in top plan of the depressions.

The pan 10 is preferably constructed of metal although it may be made of vitreous or like material. The rim 11, is shown as projecting outwardly from the pan and is provided with four transverse depressions 12, 12.

Supported on the rim 11 and in depressions are two concave or curved bars 13, each bar being supported in two diametrically opposite depressions and the bars crossing each other at the center of the dish or pan; one of the bars having a greater concaved or curved surface than the other so that it may overlie the other bar.

The depressions 12, are preferably inclined downwardly from the inner wall of the receptacle to conform to the curvature of the bars 13. An end of each bar is provided with an enlargement which may be of ring shaped formation 14, by which the bar is grasped in disengaging it from the pan, and this enlargement engages the rim for maintaining the bar in place upon the pan.

In the use of this device the pan or receptacle 10, may be lined with dough 15 as indicated in Figure 2, which lining would extend over and upon the rim 11 and into the depressions 12. Of course in baking dishes which require no lining or under crust, this dough could be omitted. After the dough has been lined in the pan and the contents placed in the pan to be baked the bars 13, are then placed upon the rim and into their respective depressions 12; whereupon the dough covering 16 is applied over the top of the receptacle and bars as clearly shown in Figure 2. After the contents of the receptacle has been baked and removed from the oven the bars 14 may be removed by imparting a movement such as a slight rotary movement sufficient to release them from the upper crust 16; whereupon they may be withdrawn from beneath the crust 16, without breaking or injuring the crust.

By employing these bars which are of such shape and size sufficient for supporting the crust, the top crust is prevented from dropping or falling into or upon the contents of the dish during the baking and preventing the crust from being affected or saturated with the juices of the pie, or food being baked.

Having described my invention what I claim as new and desire to secure by Letters Patent is:

1. A support for baking crust comprising a receptacle, and supporting bars independent of each other extending over the top of the receptacle and removably supported thereby and crossing each other at the center of the receptacle, said bars being adapted to support a dough covering over the top of the receptacle during the baking operation and removed from beneath the crust upon the completion of the baking operation.

2. A support for baking crust, comprising a receptacle and supporting bars independent of each other extending across the receptacle and removably supported thereby, for forming a support for a dough covering and adapted to be withdrawn from beneath the baked crust.

3. A support for baking crust comprising a receptacle having a rim, said rim being provided with depressions and bars independent of each other extending across the pan and received in the depressions for forming a support for a dough covering and adapted to be withdrawn from beneath the baked crust.

MARY A. MILLER.